United States Patent [19]

Willis

[11] Patent Number: 4,881,486

[45] Date of Patent: Nov. 21, 1989

[54] REMOTE INDICATING DIP STICK

[76] Inventor: William M. Willis, 19440 Citronia St., Northridge, Calif. 91324

[21] Appl. No.: 253,226

[22] Filed: Oct. 4, 1988

[51] Int. Cl.[4] ........................ G01F 23/04; G01F 23/06
[52] U.S. Cl. ........................................ 116/227; 33/722
[58] Field of Search ............................. 73/290 R, 307; 33/126.7 R, 126.7 A, 722

[56] References Cited

U.S. PATENT DOCUMENTS

| | | | |
|---|---|---|---|
| 2,539,604 | 1/1951 | Woolley | 73/290 R |
| 3,699,914 | 10/1972 | Smith | 33/722 X |
| 3,972,234 | 8/1976 | Osojnak | |
| 4,215,574 | 8/1980 | Godeux | 73/314 |
| 4,235,186 | 11/1980 | Frobose | 33/126.7 R |
| 4,649,746 | 3/1987 | Snow | 73/290 R |

OTHER PUBLICATIONS

Kevco Industries, Inc. Brochure, 1984.

*Primary Examiner*—Daniel M. Yasich
*Attorney, Agent, or Firm*—Poms, Smith, Lande & Rose

[57] ABSTRACT

A manually operable fluid level indicator as illustrated for indicating at a location remote from a reservoir whether the fluid level in the reservoir has fallen below a predetermined level. A hollow dip stick having an aperture through a side wall of a lower end thereof depends into the reservoir and is normally covered by fluid within the reservoir. An indicator housing has chamber communicating with the interior of the dip stick and has a piston moveable therein by a friction drive connection with a manually moveable plunger. On moving the plunger outwardly of the housing, the piston remains stationary if a vacuum condition exists in the conduit communicating between the dip stick and housing. If the fluid level falls below the orifice and allows air or gas to enter the conduit running to the chamber of the housing, the piston will move with the plunger when the latter is pulled outwardly of the housing and the movement of the piston is visually observed to indicate a low fluid level.

9 Claims, 3 Drawing Sheets

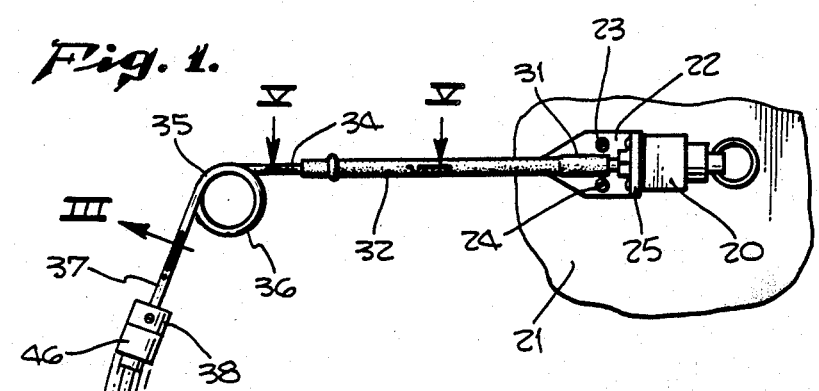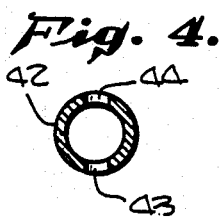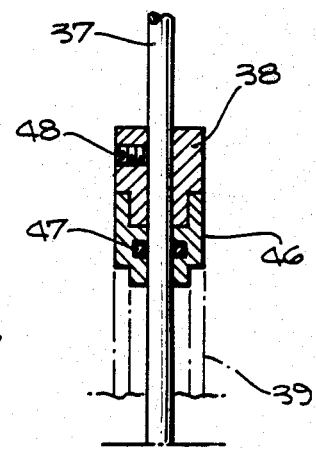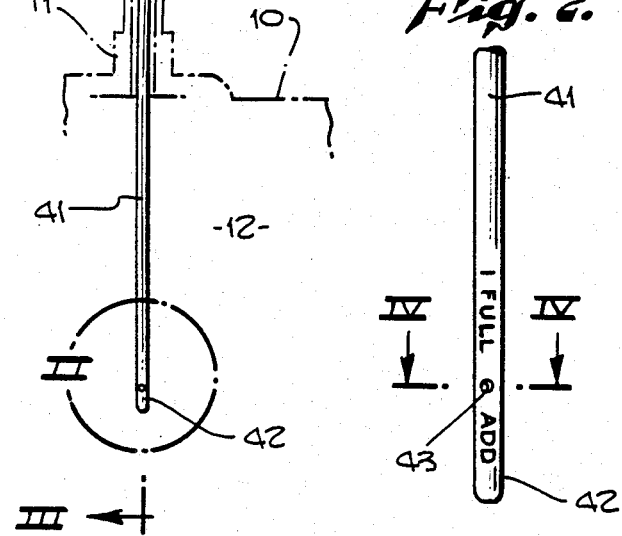

REMOTE INDICATING DIP STICK

BACKGROUND OF THE INVENTION

This invention relates in general to devices for indicating the level of fluid in a reservoir and more particularly to a manually operated fluid level indicator for indicating at a location remote from a fluid reservoir whether or not the fluid level of fluid within the reservoir has fallen below a predetermined desired level.

It is common practice in the automotive industry today to provide manually operated dip sticks for visually inspecting the level of fluid, such as oil, in engine crank cases and transmission cases. The dip stick is simply manually removed from the reservoir and the level of fluid retained on the lower end of the dip stick is observed.

However, in many installations, such as the location of the oil crank case in vacation type vehicles, the ease of accessibility is greatly restricted. It has come to my attention that it would be desirable to provide a means for observing at a location remote from the reservoir whether the fluid level within the reservoir has, or has not, fallen below a desired level. In recreation type vehicles where the oil crank case dip stick, by way of example, is located in a difficult and unaccessible location, it would be desirable to have an indicator which could be located on a conveniently observable sidewall of the engine compartment, or perhaps on the interior on the vehicle itself, positioned providing an easily observed indication of whether the fluid level has fallen below a desired level. It would also be desirable to have such an indicator where the conventional manner of measuring the level of fluid in the reservoir can be retained.

With the foregoing in mind, it is a primary object of the present invention to provide a simple, few moving parts, manually operated fluid level indicator which may be mounted at a location remote from the fluid reservoir whose fluid is to be monitored and indicate in a reliable manner at such remote location whether the level of fluid within the reservoir has fallen below a predetermined level or not.

It is a further object of the present invention to provide such a fluid level indicator wherein the components may be manipulated in a conventional manner whereby a dip stick is simply withdrawn from the reservoir and the level of fluid is observed on the dip stick in normal manner.

It is thus a still further object of the present invention to incorporate the advantages of a standard dip stick approach toward measuring the level of fluid in a reservoir and combining therewith the advantages of a remote indicator. It is still a further object of the present invention to provide an indicator as in the foregoing objects which is easily manufactured, and inexpensive to provide as original or replacement equipment and which will solve the problems of inaccessibility of an oil level indicator which has occurred in many prior standard reservoir fluid level indicators, such as manually retrievable dip sticks used in automotive transmission and crank case reservoirs.

SUMMARY OF THE INVENTION

Stated generally, the present invention in a fluid level indicator includes the provision of an indicator housing and means for mounting it at a location remote from a reservoir whose fluid is to be monitored. A fluid conduit is connected at one end to the housing fluid communication with a chamber within the housing and has a second end which dips into the reservoir, such second end having an aperture therein which is positioned at a level within the reservoir where it would be desirable to add fluid if the fluid fell below the level of the aperture. A plunger is manually moveable relative the housing and tends to move an associated piston concurrently with its movement. The piston is provided within the housing chamber and has means for biasing it to move with the plunger relative the housing. Such biasing means, however, can be overcome by a vacuum condition within the chamber, as will occur when fluid within the reservoir covers the conduit aperture, such that when the fluid level is higher than the aperture, a withdraw movement of the plunger relative to the housing does not pull the piston along with it. However, the biasing means between the piston and plunger is provided so that when the fluid level falls below the aperture in the conduit end depending into the reservoir, air or gas within the reservoir will flow through the conduit into the chamber, relieving any vacuum condition therein and the piston will thus be urged by the biasing means to ride along with the plunger when the plunger is moved relative the housing.

More specifically, the fluid conduit lower or second end which protrudes into the reservoir comprises a hollow dip stick tube with the aforestated aperture being provided through a sidewall thereof, and preferably there being two such apertures through a circular sidewall in opposing relation. The dip stick tube is connected at an upper end to a flexible hose which in turn is preferably connected to a coiled tube, the coil providing a manual area to grasp when it is desired to manually withdraw the dip stick tube, conduit and coil tube from the environment of the reservoir to give a direct visual reading of the level fluid on the lower end of the dip stick tube. An upper end of the coil tube may be connected by a flexible tube to the housing which is preferably located in a remote location relative the reservoir, such flexible tube accommodating for communication between the dip stick tube, flex hose and coil tube subassembly and the housing.

More specifically, the housing has a sidewall bore communicating between the internal chamber and exterior of the housing. The plunger is a hollow cylindrical body slidable through the housing sidewall bore with one end thereof being normally within the chamber and a second end thereof being normally outside the chamber. An inner end of the plunger has a cylindrical ridge having an associated air seal means to provide a pumping like action within the chamber cavity which is cylindrical and fits snugly about the ridge and air seal means. Moving the plunger inwardly and outwardly of the housing thus produces a pumping action to produce the vacuum condition discussed hereinbefore within the chamber when the plunger is moved in a withdraw motion. The plunger is preferably provided as a hollow cylindrical body which fits within the plunger and has its hollow interior exposed to the connection between the fluid conduit and the chamber.

As is also contemplated within the present invention, it is important to purge the fluid conduit depending into the reservoir of any reservoir fluid which might enter to conduit. The indicator housing is provided with a vent which allows air to enter the chamber within the housing when the plunger is fully withdrawn. Inward pumping motion of the plunger relative to the housing pumps air down through fluid conduit and through the conduit lower end dip stick tube associated orifices to purge the latter of any reservoir fluid. The fluid conduit is thereby freed of any liquids to be able to communicate air or gas from the reservoir, as when the fluid level within the reservoir falls below the dip stick tube associated orifice, to relieve any vacuum condition which might otherwise occur within the housing when the plunger is withdrawn, thus allowing the piston to move therewith.

The piston location is visually observable through viewing apertures in the plunger and indicates a condition where fluid need be added to the reservoir. The piston has color bands red and green; the red showing through the plunger viewing apertures when the piston travels with the plunger and green when the plunger moves away from the piston as a result of a momentary vacuum surge in the conduit. Visual observation of the red band indicates an add fluid condition.

A more complete understanding of the present invention, as well as realization of the present and additional objects and advantages thereof will become apparent to those skilled in the art from a consideration of the following detailed description of a preferred exemplary embodiment thereof. Reference will be made to the appended sheets of drawings which will be first briefly described.

BRIEF DESCRIPTION OF THE DRAWINGS

FIG. 1 is a partially schematic representation of an exemplary embodiment of manually operated fluid level indicator for indicating, at a location remote from a fluid reservoir, the level of fluid therein in accordance with the present invention.

FIG. 2 is a detail view of a portion of the dip stick tube of the indicator of FIG. 1 taken in the region indicated by II—II.

FIG. 3 is a section view through the dip stick tube and conduit portion of the fluid level indicator of FIG. 1, being partially in section, taken along the plane III—III.

FIG. 4 is a section view through the dip stick tube of FIG. 2 taken therein along the plane IV—IV.

FIG. 5 is a detail view, partially in section, of the connection between the coiled tube and flex hose portions of the indicator of FIG. 1 taken therein along the plane V—V.

FIG. 6 is a detail view, partially in section, of the flexible hose and housing portions of the indicator of FIG. 1 taken therein along the plane VI—VI.

FIG. 7 is a cross-section view of the housing, plunger and piston portions of the indicator of FIG. 6 taken therein along the plane VII—VII.

DETAILED DESCRIPTION OF THE PREFERRED EXEMPLARY EMBODIMENT

Figures 5, 6, 7:
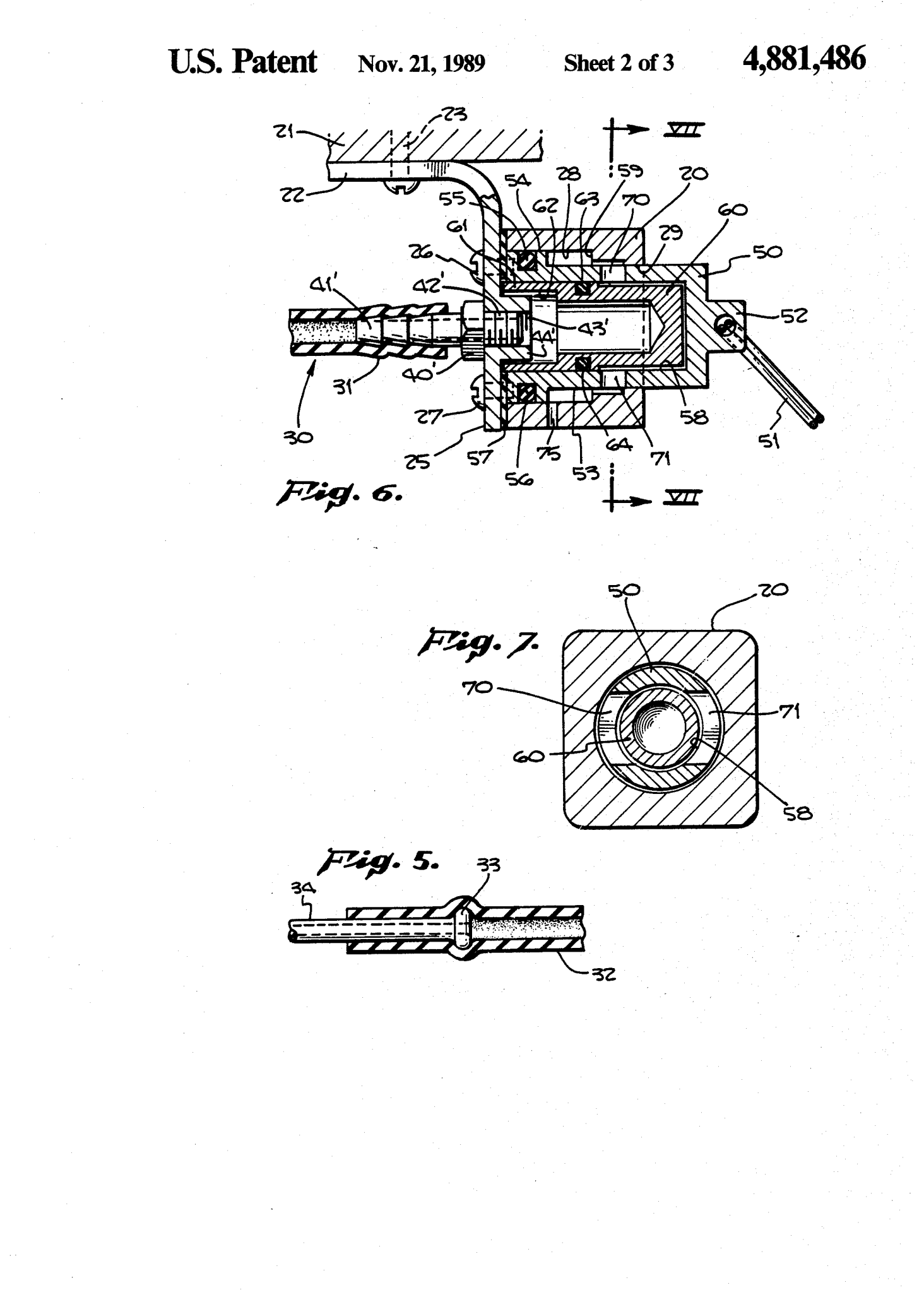
Figure 8:
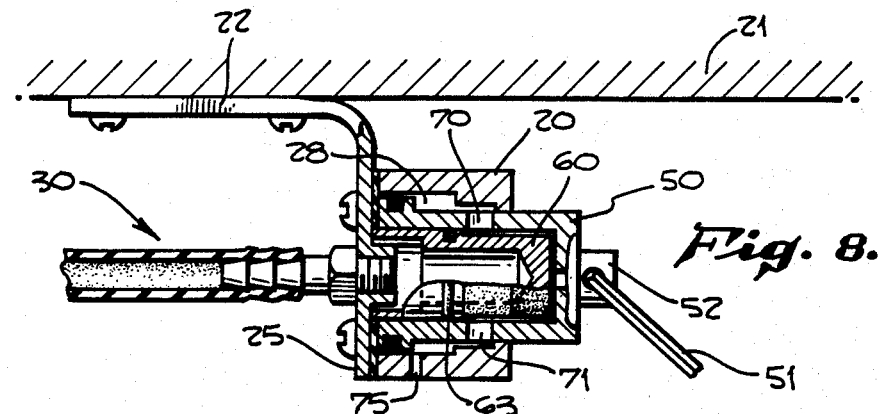
FIG. 8 is a view as in FIG. 6 showing the piston and plunger portions of the indicator of the exemplary embodiment of FIGS. 1 through 7 in a fully inwardly depressed position.

Referring initially to FIG. 1, the preferred exemplary embodiment of manually operated fluid level indicator, in accordance with the present invention, is illustrated for indicating the level of fluid within a reservoir at a visually perceivable location remote from the reservoir. While any fluid reservoir may be monitored by the indicator of the present invention, the indicator of the present invention is particularly well suited for indicating the level of oil in an automotive engine crank case or transmission case. A conventional automobile engine is schematically represented at 10 in FIG. 1 with the entrance tube thereto indicated at 11. The indicator of the present invention has an indicator housing 20 which may be located at a remote location, such as on the outside of a vehicle engine compartment, as, for example a vehicle sidewall 21. The indicator may be provided on an easily accessible part of an inner engine compartment sidewall or, preferably, generally adjacent the engine compartment but on the exterior of the vehicle, such as a camper or travel trailer vehicle where the operator can easily manipulate the indicator to determine whether the oil level in the associated oil reservoir is at least at or above a predetermined desired level. A means for mounting the housing at such location in the exemplary embodiment comprises a mounting flange 22 which may be of simple right angle construction with one leg fastened by appropriate screws 23, 24 to the vehicle sidewall and a mounting flange wall 25 thereof receiving housing 20 thereon, as by mounting screws 26 and 27 as best seen in FIG. 6. Housing 20 is provided with an interior chamber 28.

A fluid conduit, indicated generally at 30, is connected at one end 31 to the housing chamber 28 via fitting 40' which has a flexible tube retaining connector end 41' and a threaded mounting end 42' which is screwed into an appropriately tapped aperture 43' provided within the boss 44' of the mounting flange 25. Said conduit one end 31 in the exemplary embodiment comprises an end of a flexible tube 32 which, as best seen in FIG. 5, it is slip fit over a flaired end 33 of a metal tube end 34 of coiled tube 35. The coil portion 36 of coiled tube 35 provides a convenient location to manually grasp portions of the fluid conduit for using it as a manual dip stick as subsequently described. A lower end 37 of the coil tube passes through a real fitting 38 and is connected to the dip stick portion 41 which depends through the engine mounted, rigid support tube 39 onto the associated fluid reservoir.

As seen in FIGS. 1, 2 and 3, the preferred exemplary embodiment of dip stick tube 41 comprises a hollow tube whose lower tube end 42 is provided with apertures transversely therethrough as apertures 43 and 44, and a lower end aperture 45 as seen in FIG. 3. Apertures 43 and 44 are preferably provided by drilling straight through the circular sidewall of the tube 41 transversely thereof with sharp edges being provided about the apertures as best seen in FIG. 4. I have found that a sharp edge orifice in the dip stick tube orifice on each side provides a higher resistance to fluid flow therethrough and increases the pressure drop across the orifice thus promoting operation of the tube without reservoir fluid clogging the same.

The dip stick tube is adjustably moveable through a standard seal cap 46 which fits snugly thereabout by virtue of its seal 47. The desired length of dip stick tube 41 into the reservoir can therefore be adjusted for any given installation by moving the seal cap 46 to a desired location and then trapping it at such location by turning down set screw 48 on the fitting 38. As seen in FIG. 3, the dip stick tube 41 protrudes downwardly through fitting 38 through support tube 39 to facilitate such an adjustability of the working length of the dip stick tube for any particular installation.

In selecting the adjustment of the extent of tube 41 to depend into the reservoir, a desired fill level of the reservoir is determined and the apertures 43 and 44 are located at such level within the reservoir when the position of cap seal 46 is established through the turning down of set screw 48 relative the tube end 45 within fitting 40. As seen in FIG. 2, a full line and add line, the latter being indicated by aperture 43, may be graphically provided on the lower end 42 of the dip stick tube to facilitate the visual observation thereof when a vehicle operator might wish to manually remove the dip stick by disconnecting tube 32 from upper coiled tube end 34 and then, by grasping coil 36, simply manually removing the dip stick tube 41 from reservoir 12 and reading visually the level of fluid indicated by the presence of fluid on the exterior of the tube 41 in conventional manner. It is thus apparent, that the indicator device of the present invention, provides the advantage of allow a manual checking of the level of fluid in the reservoir 12 by a conventional manner in addition to the remote indication of such fluid level as is particularly contemplated within the present invention and as will now be explained.

As particularly contemplated within the present invention, the indicator of the present invention provides for an indication at a location remote from the reservoir 12 whether the fluid within reservoir has, or has not, fallen below a predetermined level, such level corresponding to the level of the conduit lower end apertures 43 and 44 within the reservoir 12. As seen in FIGS. 6 and 7, the exemplary embodiment of fluid level indicator, in accordance with the present invention, includes the provision of two moveable parts, plunger 50 and piston 60 within the housing 20, the latter having its chamber 28 in fluid communication with the interior of reservoir 12 as discussed previously. As seen in FIG. 6, chamber 28 communicates through the conduit, indicated generally 30, via the tapped hole 43' provided in the housing mounting means flange 25. Manipulation of the two moving parts 50 and 60 as will now be described, provides the desired indication as to the level of fluid within reservoir 12 as contemplated within the objects of the present invention.

Figure 9:
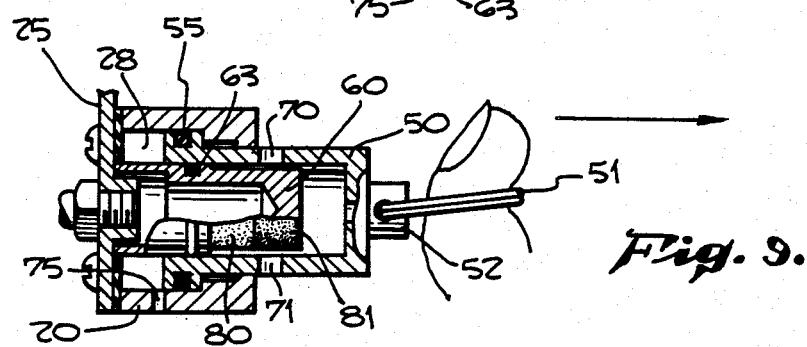
FIG. 9 is a view of the indicator components of FIG. 8 showing the plunger manually withdrawn fully relative the associated housing with the piston remaining stationary by virtue of a vacuum occurring in the associated conduit to the reservoir in the condition where the dip stick lower end, and the aperture therein, are covered by fluid in the reservoir.
Figure 10:
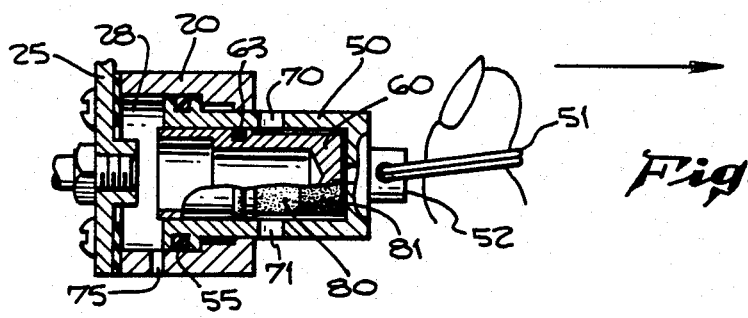
FIG. 10 is a view as in FIG. 9 showing the plunger manually withdrawn fully relative to the housing with the piston moving therewith, relative the housing, where a vacuum condition does not exist in the associated conduit, as when the fluid in the reservoir falls below the aperture end of the dip stick residing in the reservoir.
Figure 11:
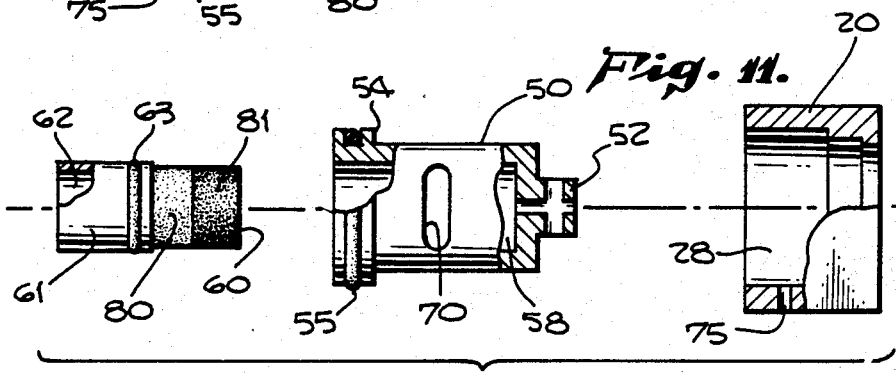
FIG. 11 is an exploded view of the piston, plunger and housing components of the indicator of FIGS. 1 through 10 in accordance with the present invention.

As seen in FIGS. 6 and 7, plunger 50 is provide with a pull ring 51 and push button 52 for manual movement of plunger 50 relative housing 20. Housing 20 is provided with a sidewall bore 29 through which the cylindrical, hollow body 53 of plunger 50 is slidably oriented. An inner end enlarged diameter ridge 54 on plunger 50 fits closely within the cylindrical chamber 28 with an air seal means provided between the plunger 50 and the housing 20, such exemplary air seal means comprising a conventional seal ring 55 provided within seal ring groove 56. Annular ridge 54 of plunger 50 limits inward movement of plunger 50 to where it abuts the housing-mounting flange seal plate 57 and in the outward direction by its abutment with the annular stop surface 59 provided within housing where the chamber diameter has been reduced, as seen in FIG. 3, adjacent bore 29. Plunger 50 may thus be manually pulled outwardly relative housing 20 with the seal means 55 sealing the engagement between plunger 50 and housing 20 until annular ridge 54 abuts surface 59, as seen in FIG. 10, and can be manually pushed inwardly, through manipulation of pull ring 51 or pushing on button 52, until it assumes the fully inward position of FIG. 6. Such pulling and pushing movement of plunger 50 creates a plunger like action within housing 20 which tends to draw air from conduit 30 into chamber 28, or not, depending upon whether the fluid level in reservoir 12 covers the conduit lower end aperture, as provided by either of apertures 43 and 44. As will now be explained, when air may flow from conduit 30 through opening 43', piston 60 tends to ride along with plunger 50 as it is withdrawn relative housing 20, but if the fluid level in reservoir 12 covers the conduit lower end apertures 43 and 44, then a vacuum condition is provided in conduit 30 and within chamber 28 which tends to hold piston 60 in a stationary position as indicated in FIG. 9.

Piston 60 is provided as a hollow cylindrical member fitted within the hollow cylindrical interior 58 of plunger 50 as seen in FIGS. 6 and 7. An inner end portion 61 of piston 60 provides a piston cavity 62 for clearance relative the boss 44'. Biasing means are provided for biasing piston 60 to move with plunger 50 when the plunger is moved inwardly and outwardly relative the housing. Such biasing means, in the exemplary embodiment, comprise a friction drive connection between piston 60 and plunger 50 comprising, specifically, the location of a rubber O-ring 63 within O-ring groove 64 provided in the periphery of the larger diameter inner end portion 61 of piston 60, as best seen in FIG. 6. The fit of the O-ring 63, surrounding groove 64 and the friction drive thus provided between piston 60 and plunger 50 is determined so that when the conduit lower end orifice, as orifices 43 and 44 in the exemplary embodiment, are covered by fluid, and a vacuum condition occurs within chamber 28, the friction drive thus provided between piston 60 and 50 will be overcome and the piston will remain stationary on a withdraw movement of plunger 50.

Visually observable indicia are provided upon the exterior surface of piston 60 which are viewable through viewing apertures 70 and 71 provided through the body of plunger 50. As seen in FIGS. 8 through 11, an inward first surface area 80 on piston 60 which may comprise a painted or silk screened colored surface such as the color red. A second indicia surface 81 on an outer end portion of piston 60 may also be painted, silk screened or otherwise colored by an indicating color, such as the color green. When the level of fluid in reservoir 12 is above the conduit lower end orifice, provided by orifices 43 and 44 in the exemplary embodiment, air or other gas within the reservoir will not be able to flow into conduit 41 such that when plunger is pulled outwardly, as seen in FIG. 9, the vacuum condition existing within the conduit, indicated generally at 30 in FIG. 8, will cause piston 60 to remain stationary within housing 20, the indicator thus giving a visual indication through viewing apertures 70 and 71 of the color green by way of example, indicating the fluid level is at an acceptable predetermine level. On the other hand, if the fluid level within reservoir 12 has fallen below the level of the conduit lower end aperture (as apertures 43 and 44) then air or gas within reservoir 12 will be free to flow within the tube 41, flex hose 39, coil tube 35 and flexible tube 32 into chamber 28, relieving any vacuum condition therein and allowing the friction drive connection between piston 60 and its surrounding plunger 50, provided by seal ring 63, to carry the piston 60 along with plunger 50 as seen in FIG. 10. Visual observation of plunger 60 through the viewing apertures 70 and 71, as seen in FIG 10, will produce a visual observation of the indicia 80 which in the exemplary embodiment comprises the color red. Such indication will indicate to the observer that the level of fluid in the reservoir 12 has fallen below a predetermined desired level and that the addition of fluid is indicated.

In order to ensure that the dip stick tube 41 internal passageway 72 remains clear of reservoir fluid which might enter through the apertures 43 and 44, means are provided for purging the interior of the dip stick tube 41 by manipulating plunger 50. As seen in FIG. 6, housing 20 is provided with a chamber venting aperture 75 for venting the chamber 28. When plunger 50 has been fully withdrawn, as seen in FIG. 9, the seal ring 55 is positioned to the right hand side of vent 75 in FIG. 9 so as to vent air into chamber 28. Thereafter, depression movement of plunger 50 from the position of FIG. 9 to the position of FIG. 8, pumps air trapped within chamber 28 down the conduit, indicated generally at 30, and through dip stick tube 41 to purge it of any reservoir fluid which might intrude through apertures 43 and 44.

It is important that the fluid communication between the conduit lower end aperture and the chamber 28 be maintained so that the passage of air or gas therethrough can facilitate the release of piston 60 from its position at FIG. 9 to that of FIG. 10 when the fluid level has fallen below a predetermined desired level. A most important feature of the system is the automatic venting of the conduit as the plunger is withdrawn relative the housing. In addition to accomplishing a negative pressure in one direction and a positive (compression) in the reverse direction, it also results in only a momentary vacuum surge as the plunger is withdrawn. If this feature were not in the exemplary embodiment, a hard vacuum would result in a column of fluid in the tube as opposed to a few drops as in this system. This allows a universal dip stick length eliminating the possibility of fluid entrapment in the coiled portion of the dip stick in the case of a short dip stick.

To assure that the indicator is indicating properly, it is desired that the plunger 50 be cycled in and out at least two times to purge the hollow dip stick 41 before observing a final reading of the location of piston 60 relative plunger 50 when it is withdrawn. Also, in this simple two part device, the inertia of the piston effect the reading of the indicator if the plunger is suddenly jerked outwardly in such a manner that the piston location remains constant, not because of the friction drive between it and the plunger, but because of the inertia of the piston. It is therefore preferred that a reasonable, smooth motion be applied in manipulating the plunger 50 inwardly and outwardly so that the friction drive of seal ring 63 in its cooperation with the vacuum condition existing, or not existing within chamber 28 (FIG. 6) may determine the relationship of the piston and plunger to provide an accurate reading.

Having thus described an exemplary embodiment of manually operated fluid level indicator for indicating at a location remote from a fluid reservoir, whether the fluid level of the fluid therein has fallen below a predetermined level, it should be appreciated by those skilled in the art that various modifications, adaptations and alterations of the present embodiment may be accomplished within the scope of the present invention. By way of example, the present indicator may be employed with reservoirs containing any fluids inclusive of oil, water, gasoline or other fluids. The indicator housing may be mounted at any desired location, as on the wall of a stationary facility adjacent a reservoir or on some part of a vehicle where it is readily observable by the vehicle operator as suggested in the exemplary embodiment herein.

I claim:

1. A manually operated fluid level indicator for indicating at a location remote from a fluid reservoir whether the level of fluid therein has reached a predetermined level, said indicator comprising:

an indicator housing and means for mounting it at a location remote from said reservoir, said housing having a chamber therein;

a fluid conduit connected at one end to said housing in fluid communication with said housing chamber and having a second end depending into said reservoir and having an aperture in said second end, said aperture being normally closed by fluid in said reservoir when said fluid is above a predetermined level, but being opened to the interior of said reservoir when the level of fluid in said reservoir falls to a level below said predetermined level;

a plunger manually moveable inwardly and outwardly of said housing in a pumping action relative said chamber and associated conduit;

a piston in said chamber and means for biasing said piston to move relative said housing with movement of said plunger when the level of fluid in said reservoir is below said conduit second end aperture and to remain stationary relative said housing with movement of said plunger when the level of fluid in said reservoir is above said conduit second end aperture; and wherein said housing is provided with a chamber venting aperture for venting said chamber to atmosphere when said plunger is fully withdrawn relative said housing whereby air is pumped through said conduit from said chamber by movement of said plunger inwardly of said chamber following a fully withdrawn movement thereof to purge said conduit of reservoir fluid.

2. The fluid level indicator of claim 1 wherein said fluid conduit second end comprises:

a hollow dip stick tube with said aperture being provided through a sidewall thereof at a location indicative of a need to add fluid in said reservoir.

3. A manually operated fluid level indicator for indicating at a location remote from a fluid reservoir whether the level of fluid therein has reached a predetermined level, said indicator comprising:

an indicator housing and means for mounting it at a location remote from said reservoir, said housing having a chamber therein;

a fluid conduit connected at one end to said housing in fluid communication with said housing chamber and having a second end depending into said reservoir and having an aperture in said second end, said aperture being normally closed by fluid in said reservoir when said fluid is above a predetermined level, but being opened to the interior of said reservoir when the level of fluid in said reservoir falls to a level below said predetermined level and wherein said fluid conduit second end comprises a hollow dip stick tube with said aperture being provided through a sidewall of said tube at an add fluid level in said reservoir;

a plunger manually moveable relative said housing; and a piston in said chamber and means for biasing said piston to move relative said housing with movement of said plunger when the level of fluid in said reservoir is below said conduit second end aperture and to remain stationary relative said housing upon movement of said plunger when the level of fluid in said reservoir is above said conduit second end aperture wherein said fluid reservoir is provided with an entry tube through which said dip stock tube passes and an adjustable seal cap on said dip stick tube which seats on said entry tube and is adjustable over the length of said dip stick tube to selectively adjust the depth of penetration of said dip tick tube into said reservoir when said seal cap seats on said entry tube.

4. A manually operated fluid level indicator for indicating at a location remote from a fluid reservoir whether the level of fluid therein has reached a predetermined level, said indicator comprising:

an indicator housing and means for mounting it at a location remote from said reservoir, said housing having a chamber therein;

a fluid conduit connected at one end to said housing in fluid communication with said housing chamber and having a second end depending into said reservoir and having an aperture in said second end, said aperture being normally closed by fluid in said reservoir when said fluid is above a predetermined level, but being opened to the interior of said reservoir when the level of fluid in said reservoir falls to a level below said predetermined level wherein said fluid conduit second end comprises a hollow dip stick tube with said aperture being provided through a sidewall of said tube at an add fluid level in said reservoir;

a plunger manually moveable relative said housing; and a piston in said chamber and means for biasing said piston to move relative said housing with movement of said plunger when the level of fluid in said reservoir is below said conduit second end aperture and to remain stationary relative said housing upon movement of said plunger when the level of fluid in said reservoir is above said conduit second end aperture wherein said fluid conduit further comprises:

a coiled tube connected to an upper end of said hose whereby said dip stick tube and coiled tube may be manipulated relative said reservoir in the manner of a fluid level indicating dip stick.

5. The fluid level indicator of claim 4 wherein said fluid conduit further comprises:

a flexible tube releasably connected to said coiled tube to facilitate separation of said coiled tube and dip stick tube therefrom, said flexible tube being connected to said housing in fluid communication with said chamber.

6. The fluid level indicator of claim 5 wherein:

said plunger is moveable inwardly and outwardly of said housing in a pumping action relative said chamber and associated conduit; and said housing is provided with a chamber venting aperture for venting said chamber to atmosphere when said plunger is fully withdrawn relative said housing whereby air is pumped through said conduit from said chamber by movement of said plunger inwardly of said chamber following a fully withdrawn movement thereof to purge said conduit of reservoir fluid.

7. A manually operated fluid level indicator for indicating at a location remote from a fluid reservoir whether the level of fluid therein has reached a predetermined level, said indicator comprising:

an indicator housing and means for mounting it at a location remote from said reservoir, said housing having a chamber therein;

a fluid conduit connected at one end to said housing in fluid communication with said housing chamber and having a second end depending into said reservoir and having an aperture in said second end, said aperture being normally closed by fluid in said reservoir when said fluid is above a predetermined level, but being opened to the interior of said reservoir when the level of fluid in said reservoir falls to a level below said predetermined level wherein said fluid conduit second end comprises a hollow dip stick tube with said aperture being provided through a sidewall of said tube at an add fluid level in said reservoir;

a plunger manually moveable relative said housing; and a piston in said chamber and means for biasing said piston to move relative said housing with movement of said plunger when the level of fluid in said reservoir is below said conduit second end aperture and to remain stationary relative said housing upon movement of said plunger when the level of fluid in said reservoir is above said conduit second end aperture wherein said housing has a sidewall chamber venting bore communicating between said chamber and the exterior of said housing;

said plunger is slidable through said bore with one end thereof being normally within said chamber and a second end thereof being normally outside of said housing; and air seal means operable between said plunger and housing whereby withdrawal movement of said plunger relative said housing tends to draw a vacuum within said chamber and conduit when said conduit second end aperture is covered by fluid in said reservoir until said plunger passes said chamber venting bore.

8. The fluid level indicator of claim 7 wherein:

said means for biasing said piston to move with said plunger includes a friction drive connection between said piston and plunger which is insufficient to cause movement of said piston with movement of said plunger when a vacuum condition is effected in said conduit by virtue of the fluid in said reservoir covering said conduit second end aperture.

9. The fluid level indicator of claim 8 wherein:

said plunger is hollow and said piston is fitted within said plunger; and said biasing means comprises a seal ring positioned between said piston and plunger.

* * * * *